United States Patent [19]

Gozdawa

[11] Patent Number: 5,795,077
[45] Date of Patent: Aug. 18, 1998

[54] TILTING PAD JOURNAL BEARING

[75] Inventor: Richard Gozdawa, Newtown, United Kingdom

[73] Assignee: Welsh Innovations Limited, Cardiff, Wales

[21] Appl. No.: 836,506

[22] PCT Filed: Oct. 26, 1995

[86] PCT No.: PCT/GB95/02527

§ 371 Date: Apr. 25, 1997

§ 102(e) Date: Apr. 25, 1997

[87] PCT Pub. No.: WO96/13672

PCT Pub. Date: May 9, 1996

[30] Foreign Application Priority Data

Oct. 26, 1994 [GB] United Kingdom .................. 9421569

[51] Int. Cl.[6] .................................................. F16C 17/03
[52] U.S. Cl. ................................. 384/312; 384/117
[58] Field of Search ........................ 384/117, 119, 384/309, 312, 215, 224

[56] References Cited

U.S. PATENT DOCUMENTS

| 3,318,643 | 5/1967 | Pilarczyk et al. ........................ 384/312 |
| 3,370,334 | 2/1968 | Pilarczyk et al. ........................ 29/898.042 |
| 4,039,228 | 8/1977 | Repose et al. ........................... 384/312 |
| 4,268,094 | 5/1981 | Greene .................................... 384/117 |
| 4,515,486 | 5/1985 | Ide ......................................... 384/117 |
| 4,927,275 | 5/1990 | Lawson ................................... 384/117 |

*Primary Examiner*—Thomas R. Hannon
*Attorney, Agent, or Firm*—David P. Gordon; David S. Jacobson

[57] ABSTRACT

The bearing for supporting a rotatable shaft 2 comprises an annular housing 7 around the shaft 2; movable bearing members 6 arranged in the annular housing 7, each bearing member 7 making bearing contact with the rotatable shaft 2 or component 3, circumferential movement of bearing members 6 being prevented by location pins 9 mounted in the housing 7. Inwardly projecting pivot members 8 are located in the housing 7 having a concave surface portion contacting a bearing member 6 such that each bearing member 6 is pivotable about a respective pivot member 8, and/or being of a polymer material.

20 Claims, 1 Drawing Sheet

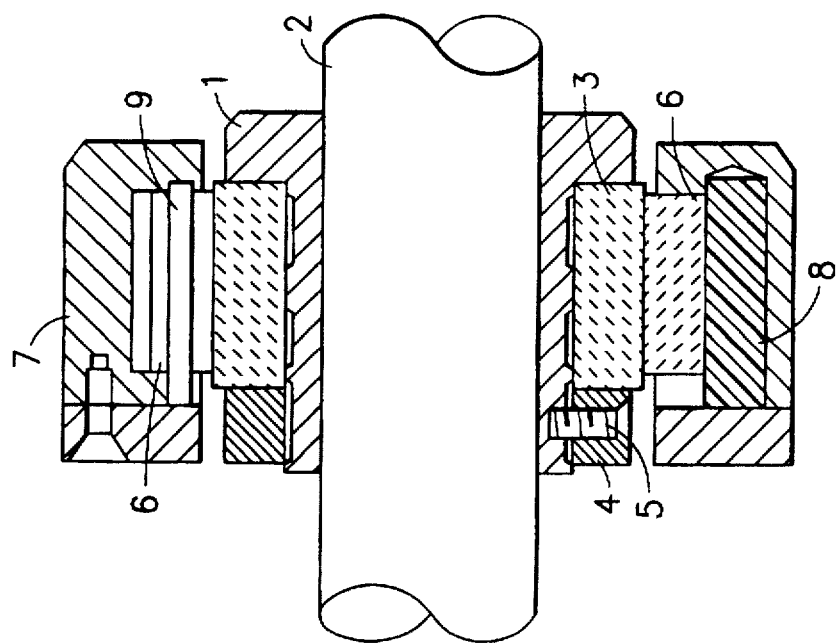
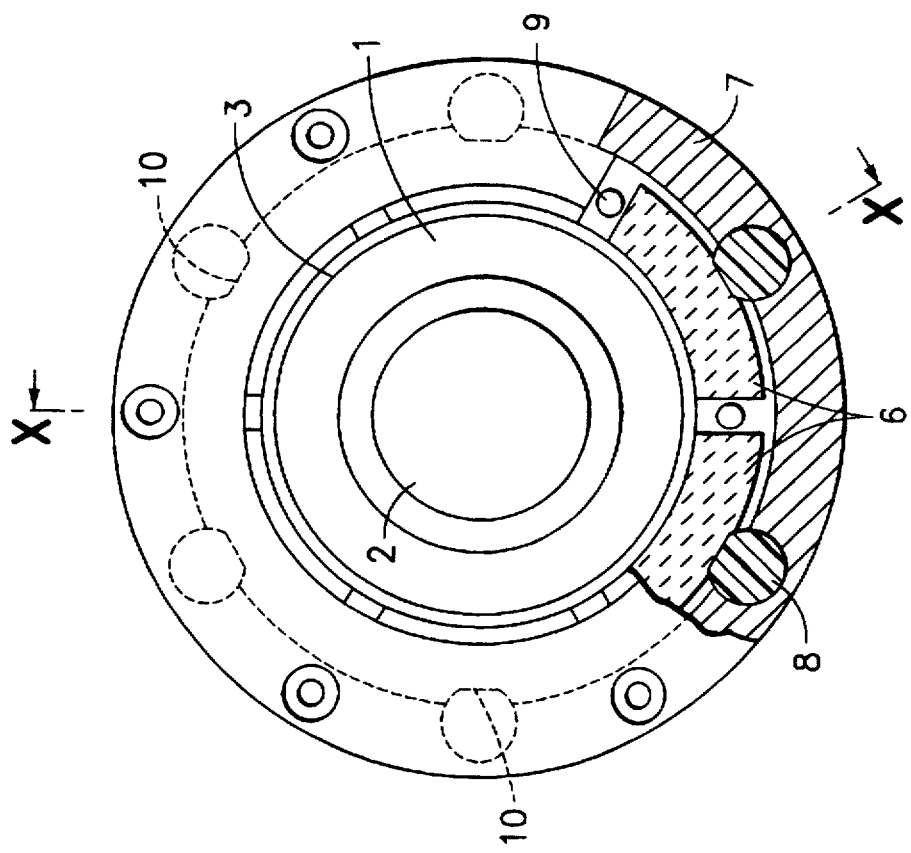

TILTING PAD JOURNAL BEARING

BACKGROUND OF THE INVENTION

1. Field of the Invention

The invention relates to a tilting pad journal bearing for supporting a rotatable shaft.

2. State of the Art

Tilting pad journal bearings are widely used for supporting rotating shafts in high speed rotary machines, in order to minimise effects of shaft vibrations, and uneven shaft loading.

Traditionally such bearings have used hard metallic pivots, pivotal inserts or spring pivots for mounting bearing pads in the bearing housing (for example, U.S. Pat. No. 4,039,228 discloses a tilting pad journal bearing having hard pivotal inserts).

Disadvantages exist with both of the above methods of pad mounting, since a hard pivot tends to amplify shaft vibrations through the bearing housing and into the supporting structure, and spring pivots provide unsatisfactory bearing conformability. Additionally high stresses can occur due to point loading at the pivot point which reduces the life of the bearing, and increases the possibility of bearing failure due to fatigue.

SUMMARY OF THE INVENTION

According to the present invention there is provided a tilting pad journal bearing for supporting a shaft, which bearing comprises an annular housing locatable around said shaft, a plurality of movable bearing members, and a plurality of inwardly projecting pivot members located in said housing, each being disposed contiguous with a respective bearing member. The bearing members each have an arcuate inner bearing surface and an opposed arcuate outer surface, and are disposed around said housing such that in use said inner bearing surfaces make bearing contact with said shaft, or a component attached thereto. Movement restricting means are provided integral with or attached to said housing and arranged to restrict the circumferential movement of said bearing members relative to said housing. The inwardly projecting pivot members are either formed of a polymer material and/or have a concave pivot surface portion arranged to complementarily abut said outer arcuate surface of said bearing member such that each bearing member is pivotable about a respective pivot surface portion.

The provision of concave pivot surface portions and the use of a polymer material for the pivot members alleviates the abovementioned disadvantages of known bearings.

It is preferred that each of said pivot members is in the form of an elongate member, having its longitudinal axis substantially parallel to said shaft. It is further preferred that the pivot members are of substantially circular cross-section. Preferably the pivot members are of an engineering polymer material, such as a polytheretherketone (PEEK) or the like.

It is preferred that the movement restricting means comprises a plurality of stop members (preferably elongate pins) fixable in the housing adjacent the opposed ends of each bearing member, the longitudinal axis of each of the pins preferably being arranged substantially parallel to the shaft.

Preferably the bearing members are of a ceramic material, or at least provided with a ceramics bearing surface.

Preferably bearing contact is made with a component attached to the shaft, which component is preferably an annular sleeve having an interference fit with the shaft. Advantageously the component is of a ceramic material, or at least provided with a bearing contacting surface of a ceramic material.

It is preferred that the bearing members are regularly spaced around the housing. Advantageously at least four, and more preferably six, bearing members are provided around the housing.

In use, the bearing according to the invention may be air or gas lubricated, or hydrodynamically lubricated with a suitable lubricant, which lubricant may be water, oil or the like.

The invention will be further described in a particular embodiment, by way of example only, with reference to the accompanying drawings.

BRIEF DESCRIPTION OF THE DRAWINGS

FIG. 1 is a sectional end view through a shaft supported by a bearing according to the invention; and FIG. 2 is a sectional view along X—X of the bearing shown in FIG. 1.

DETAILED DESCRIPTION OF THE PREFERRED EMBODIMENTS

Referring to FIGS. 1 and 2, a collar 1 is mounted on a rotatable shaft 2 by means of an interference fit. A ceramic sleeve 3 is interference fitted around the collar and axially held by means of a securing sleeve 4 fixed to the collar by means of a screw 5.

Six ceramic bearing pads 6 are arranged in a regularly spaced relationship around an annular housing 7, being located in a U-shaped channel in the housing so as to prevent movement of the pads 6 in the axial direction of the shaft. The pads 6 are mounted on respective cylindrical polymeric pivots 8 located in the housing 7 so as to partially project into the U-shaped channel and support the pads 6. The pivots 8 each have a concave surface portion 10 in the region of contact with the pads 6; the concave surface portion 10 abuts and conforms to the arcuate outer surface of respective bearing pads 6. Location stop pins 9 are mounted in the housing 7 so as to traverse the channel section intermediate the ends of adjacent pads 6, in order to prevent circumferential movement of the pads 6 induced by rotation of the shaft 2.

In operation, the shaft 2 rotates in unison with the collar 1, ceramic sleeve 3 and securing sleeve 4. The outer surface of the ceramic sleeve forms a moving bearing surface with which the bearing pads 6 are in bearing contact. The bearing pads 6, are pivotable on their respective polymer pivots in order to compensate for any radial movement of, or out of balance forces in the rotating shaft. The use of a polymer pivot such as polyetheretherketone (PEEK), and also the provision of the concave surface portion 10, provides high conformability and damping properties, and improved overall bearing characteristics especially in terms of vibration isolation, reducing vibration transmitted through the bearing to a supporting structure.

The bearing is hydrodynamically lubricated, contained in a sealed unit in a conventional manner.

I claim:

1. A tilting pad journal bearing for supporting a shaft, which bearing comprises:
    a) an annular housing locatable around the shaft;
    b) a plurality of movable bearing pad members, each having an arcuate inner bearing surface and an opposed arcuate outer surface, said members being disposed around said housing such that in use said inner bearing surfaces make bearing contact with the shaft or a component attached to the shaft;

c) movement restricting means coupled to said housing for restricting circumferential movement of said bearing pad members relative to said housing; and d) a plurality of inwardly projecting pivot members located in said housing, each being disposed contiguous with a respective bearing pad member, and each having a concave pivot surface portion arranged to complementarily abut said outer arcuate surface of said bearing member such that each bearing pad member is pivotable about a respective pivot surface portion.

2. A tilting pad journal bearing according to claim 1, wherein:
said plurality of inwardly projecting pivot members are comprised of a polymer material.

3. A tilting pad journal bearing according to claim 2, wherein:
said polymer material is polyetheretherketone (PEEK).

4. A tilting pad journal bearing according to claim 1, wherein:
said pivot members are of substantially circular cross-section.

5. A tilting pad journal bearing according to claim 1, wherein:
said movement restricting means comprises a plurality of stop members arranged intermediate respectively adjacent bearing pad members.

6. A tilting pad journal bearing according to claim 5, wherein:
each of said plurality of movable bearing pad members has opposing ends, and
said stop members comprise elongate pins fixable in said housing adjacent respective of said opposing ends of said bearing pad members, each of said elongate pins having a longitudinal axis substantially parallel to the shaft.

7. A tilting pad journal bearing according to claim 6, wherein:
said bearing pad members are comprised of a ceramic material, said pivot members are of substantially circular cross-section, and
said plurality of movable bearing pad members comprises at least four movable bearing pad members.

8. A tilting pad journal bearing according to claim 1, wherein:
said plurality of movable bearing pad members comprises at least four movable bearing pad members.

9. A tilting pad journal bearing according to 1, wherein:
said bearing pad members are comprised of a ceramic material.

10. A tilting pad journal bearing for supporting a shaft, which bearing comprises:
a) an annular housing locatable around the shaft;
b) a plurality of movable bearing pad members, each having an arcuate inner bearing surface and an opposed arcuate outer surface, said members being disposed around said housing such that in use said inner bearing surfaces make bearing contact with the shaft or a component attached to the shaft;

c) movement restricting means coupled to said housing for restricting circumferential movement of said bearing pad members relative to said housing; and d) a plurality of inwardly projecting polymeric pivot members located in said housing, disposed contiguous with a respective bearing pad member.

11. A tilting pad journal bearing according to claim 10, wherein:
each of said polymeric pivot members has a pivot surface portion arranged to complementarily abut said outer arcuate surface of said bearing member such that each bearing pad member is pivotable about a respective pivot surface portion.

12. A tilting pad jounral bearing according to claim 11, wherein:
said pivot surface portion is concave.

13. A tilting pad journal bearing according to claim 10, wherein:
said polymer material is polyetheretherketone (PEEK).

14. A tilting pad journal bearing according to claim 10, wherein:
said pivot members are of substantially circular cross-section.

15. A tilting pad journal bearing according to claim 10, wherein:
said movement restricting means comprises a plurality of stop members arranged intermediate respectively adjacent bearing pad members.

16. A tilting pad journal bearing according to claim 15, wherein:
each of said plurality of movable bearing pad members has opposing ends, and
said stop members comprise elongate pins fixable in said housing adjacent respective of said opposing ends of said bearing pad members, each of said elongate pins having a longitudinal axis substantially parallel to the shaft.

17. A tilting pad journal bearing according to claim 16, wherein:
said bearing pad members are comprised of a ceramic material, said pivot members are of substantially circular cross-section, and
said plurality of movable bearing pad members comprises at least four movable bearing pad members.

18. Rotating machinery, comprising:
a) a shaft;
b) an annular housing locatable around said shaft;
c) a plurality of movable bearing pad members, each having an arcuate inner bearing surface and an opposed arcuate outer surface, said members being disposed around said housing such that in use said inner bearing surfaces make bearing contact with said shaft or a component attached to said shaft;

d) movement restricting means coupled to said housing for restricting circumferential movement of said bearing pad members relative to said housing; and d) a plurality of inwardly projecting pivot members located in said housing, each being disposed contiguous with a respective bearing pad member, and each having at least one of
(i) a concave pivot surface portion arranged to complementarily abut said outer arcuate surface of said bearing member such that each bearing pad member is pivotable about a respective pivot surface portion, and (ii) being comprised of a polymer material.

19. Rotating machinery according to claim 18, further comprising:

e) a ceramic annular sleeve coupled to said shaft, wherein said movable bearing pad members are comprised of ceramic.

20. Rotating machinery according to claim 19, further comprising:

means for hydrodynamically lubricating said movable bearing pad members.

* * * * *